Aug. 6, 1935.       L. N. HAYDEN       2,010,515

CHUTE STRUCTURE

Filed Dec. 15, 1933

Inventor:
Lester N. Hayden
by Walter J. Jms
Atty.

Patented Aug. 6, 1935

2,010,515

UNITED STATES PATENT OFFICE 2,010,515

CHUTE STRUCTURE

Lester N. Hayden, Arlington, Mass., assignor to United-Carr Fastener Corporation, Cambridge, Mass., a corporation of Massachusetts Application December 15, 1933, Serial No. 702,527

3 Claims. (Cl. 218—2.1)

My invention aims to provide improvements in chute structures for conveying fasteners and like parts.

In the drawing which illustrates a preferred embodment of my invention:—

My invention as illustrated is particularly useful in connection with a chute for conveying fastener and like parts in an attaching machine or like where parts are moved from one point to another by means of a chute. The chute may be straight or it may be bent and curved. Heretofore, chutes for the same purpose have been made of brass and like non-rusting metal. These chutes become worn in use and must be replaced all too frequently. Steel and other similar metal chutes have been used, but they rust and, therefore, are not as suitable. If the steel is coated or plated the coating wears off and then the rust sets in. However, the chutes heretofore used were not satisfactory due to wear or rust and thus required expensive replacement of the entire chute.

Figure 1:
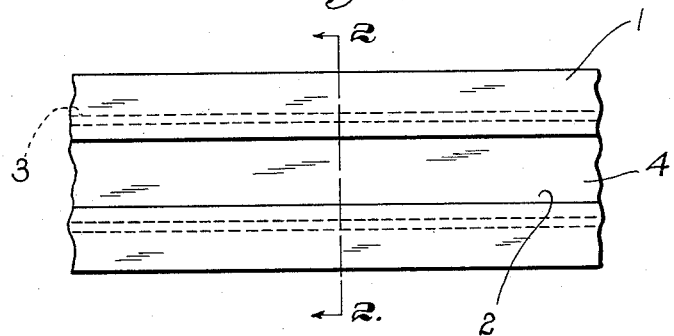
Figure 1 is a plan view of a portion of my improved chute structure.
Figure 2:
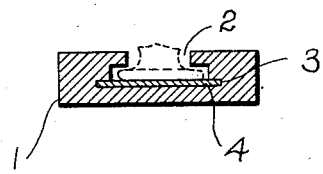
Fig. 2 is a section taken on the line 2—2 of Figure 1 with a chute-carrying part shown in dotted lines.

In order to overcome the troubles and expense heretofore experienced, I have provided a chute which has an elongated body portion 1 formed from a single piece of brass or other non-rusting and easily bent and worked metal. A part-conveying groove 2 of any suitable shape is milled, or otherwise formed, in the body portion 1. In addition, opposed narrow slots 3—3 (Fig. 2) are formed adjacent to the bottom of the groove 2 and these slots extend the entire length of the chute. In order to overcome the wear which occurs almost entirely at the bottom of the groove 2, I use an insert 4 which is made of thin, tough, non-rusting steel or like metal. The insert 4 is flexible and is slid into place with its edges in the grooves 3—3.

The insert piece 4 provides a wear-resisting bottom to the groove 2 which may be easily and quickly inserted into and removed from position. Thus when the wear-resisting insert does become worn or rusted it may be removed and a new one inserted while the remainder of the structure is left intact for continued use. My improved structure is relatively easy to construct and to keep in repair.

While I have illustrated and described a preferred embodment of my invention, I do not wish to be limited thereby, because the scope of my invention is best defined by the following claims.

I claim

1. A chute structure for conveying fastener and like parts comprising, in combination, a main body part formed from a soft readily bendable type of metal and having a fastener part carrying groove, a wear-resisting thin flexible metallic strip along the bottom of said groove to prevent wear of the main body part, and said strip being secured against warping throughout its entire length.

2. A chute structure for conveying fastener and like parts comprising, in combination, a main body part formed from a strip of metal of substantial thickness provided with a longitudinal fastener part carrying groove and a wear-resisting renewable insert slid into grooves in said body part adjacent to the bottom of the fastener part groove and secured by said grooves against warping for the purposes described.

3. A chute structure of the class described having an elongated main body portion provided with a longitudinal groove, a pair of oppositely positioned grooves in the body portion adjacent to the bottom of the first groove and a flexible wear-resisting insert strip in the bottom of said first groove and having its edges located in the pair of grooves for the purposes described.

LESTER N. HAYDEN.